United States Patent [19]

Nordberg

[11] Patent Number: 4,573,924
[45] Date of Patent: Mar. 4, 1986

[54] TARGET IMAGE PRESENTATION SYSTEM
[75] Inventor: Anthony Nordberg, Sussex, England
[73] Assignee: GQ Defence Equipment Limited, Godalming, England
[21] Appl. No.: 670,065
[22] Filed: Nov. 9, 1984
[30] Foreign Application Priority Data
Nov. 14, 1983 [GB] United Kingdom ............... 8330355
[51] Int. Cl.$^4$ ................................................ F41J 5/08
[52] U.S. Cl. ......................................................... 434/20
[58] Field of Search ................................... 434/20-22, 434/43, 44

[56] References Cited
U.S. PATENT DOCUMENTS
3,588,237 6/1971 Aldrich ............................... 434/20

FOREIGN PATENT DOCUMENTS
707877 4/1954 United Kingdom .................. 434/20
2046410 11/1980 United Kingdom .................. 434/20

Primary Examiner—Richard C. Pinkham
Assistant Examiner—Leo P. Picard
Attorney, Agent, or Firm—Kenyon and Kenyon

[57] ABSTRACT

A target presentation system for displaying images of a target on the interior surface of a part-spherical dome provides an observer within the dome with a visual representation of an aerial target flying a flight profile within an airspace surrounding the observer. A projector projects an image carrying beam carrying target images corresponding to those which would be viewed by a ground observer during the flight of the target in the flight profile and directs the image carrying beam to positions on the dome corresponding to those positions of a target traversing the airspace represented by the dome. The projector includes a focus control lens to maintain the image on the dome in focus throughout the visual representation of the predetermined flight profile for a position of the target presentation system within the dome offset from the center of the dome.

12 Claims, 4 Drawing Figures

TARGET IMAGE PRESENTATION SYSTEM

The present invention relates to a target image presentation system and is particularly although not exclusively concerned with a target presentation system in which the image of a target is provided on a cinematograph film and is projected on to a screen by a cinematograph projector.

In a target acquisition training system which has been proposed, a target image presentation system displays images of a target aircraft on the interior surface of a part-spherical dome in such a manner as to provide for an observer within the dome a visual representation of an aircraft flying a predetermined flight profile within an air space surrounding the observer. The target image presentation system includes a stationary cinematograph projector which projects an image carrying beam carrying target images corresponding to those which would be viewed by a ground observer within the dome during the flight of the aircraft in the predetermined flight profile and an image beam deflection assembly for directing the image carrying beam to positions on the dome corresponding to the positions of the aircraft traversing the air space represented by the dome.

The target presentation system above described has however the disadvantage that it can be used for the presentation of only one aircraft flight profile at a time. Furthermore, it has been considered necessary to place the system at the centre of the dome with the limitation that only one system can be accommodated in the dome. In particular, the target image deflection assembly has hitherto been located at the centre of the dome so that the projection range of the image is constant and the image once brought into focus on the dome remains in focus throughout its traverse of the dome.

Use of the system described has hitherto been regarded as satisfactory for the development of tracking skills by trainee anti-aircraft gunners. Recent experience has, however, shown that gunners so trained, while made competent to engage enemy aircraft in a situation where the aircraft overfly singly and in succession at well spaced intervals, gather no skills in handling an attack situation in which several aircraft are present in the engagement area simultaneously. The gunner in such a multiple attack situation needs skill in instantly assessing the situation, recognising friend from foe and making a choice as to the order in which the aircraft are to be engaged. Although efforts have been made to overcome this disadvantage by arranging for target flight profiles to be displayed in very rapid succession, the problem of simulating a multiple attack situation in which two or more aircraft are present in the engagement area simultaneously has remained.

According to the present invention there is provided a target presentation system for displaying images of a target on the interior surface of a part-spherical dome to provide for an observer within the dome a visual representation of an aerial target flying a predetermined flight profile within an airspace surrounding the observer comprising projection means for projecting an image carrying beam carrying target images corresponding to those which would be viewed by a ground observer during the flight of the target in the predetermined flight profile, whilst directing the image carrying beam to positions on the dome corresponding to those positions of a target traversing the airspace represented by the dome, the projection means including focus control means to maintain the image on the dome in focus throughout the visual representation of the predetermined flight profile for a predetermined position of the target presentation system within the dome offset from the centre of the dome.

It will be apparent that since the target presentation system according to the invention can be used at a position offset from the centre of the dome it can be used with one or more other such systems also offset from the centre of the dome or with a system as previously used at the centre of the dome to provide for the display of two or more targets overflying the engagement area simultaneously. Furthermore, the system according to the invention enables the centre of the dome to be left clear for the emplacement of simulated gun or missile systems to be operated by trainees.

Preferably, the focus control means comprises a focus control lens through which the image carrying beam from the projector is caused axially to pass, and focus control drive means for moving the lens axially to bring the image into focus on the dome.

In a preferred embodiment of the invention, and the projection means includes beam deflection drive means for directing the image carrying beam in accordance with the predetermined flight profile in response to a beam deflection control input obtained from a data file dedicated to the predetermined flight profile and the focus control drive means is responsive to a focus control input obtained from the data file.

Preferably, the projection means comprises a cinematograph projector for projecting the target images on to the dome from a cinematograph film bearing on successive frames of the film target images corresponding to those which would be viewed by a ground observer within the dome at successive time intervals during the flight of the target in the predetermined flight profile. The cinematograph film for use in the system may then be produced by displaying a model of the target and producing from the model images on the film under the control of a film production program which produces scripts for the film production operator and which utilises data of the aircraft's position and orientation with respect to the earth's axis at fixed intervals of time throughout the flight profile and the data file dedicated to the flight profile is generated when the film production operator's scripts are produced.

In a preferred embodiment of the invention the cinematograph projector is a stationary cinematograph projector and the projection means then includes a beam deflection assembly for directing the image carrying beam to positions on the dome corresponding to those of the aircraft flying the predetermined flight profile, with the beam deflection drive means being connected to drive the beam deflection assembly. The beam deflection assembly preferably comprises an azimuth deflection assembly for deflecting the image carrying beam in azimuth and an elevation deflection assembly for deflecting the image carrying beam in elevation. The data file dedicated to the flight profile then provides values of the elevation and azimuth of the image on the dome as measured from the projection means for use in generating azimuth deflection control signals for driving the azimuth deflection assembly and elevation deflection control signals for driving the elevation deflection assembly.

In an embodiment of the invention hereinafter to be described the azimuth deflection assembly comprises a first inclined reflecting element which directs the image carrying beam from the stationary projector into a vertical path and a second inclined reflecting element which redirects the vertically directed beam into a horizontal path and which is rotatable about the axis of the vertically directed beam to vary the azimuth of the image on the dome and the focus control lens is arranged in the vertical beam path between the first and second reflecting elements. The second reflecting element may then be mounted in a rotatable head and the elevation deflection assembly may then comprise a third reflecting element which is carried by the head for redirecting the image carrying beam in the horizontal path into a path at right angles to the horizontal path and which is rotatable about the axis of the beam in the horizontal path to vary the elevation of the image on the dome.

The scripts for the film production operators are preferably such as to produce images on the film which correct for variations in the size of the image resulting from the offsetting of the system from the centre of the dome. Furthermore, data on the data file dedicated to the flight profile may be accessed to control the image intensity to compensate for variations resulting from the offsetting of the system from the centre of the dome.

Preferably, each film produced contains a plurality of different flight profiles and a dedicated data base disc file is provided for use with each film, which carries a data file dedicated to each profile and which is used when the film is run.

Some embodiments of the invention will now be described by way of example with reference to the accompanying drawings in which.

Figure 1:
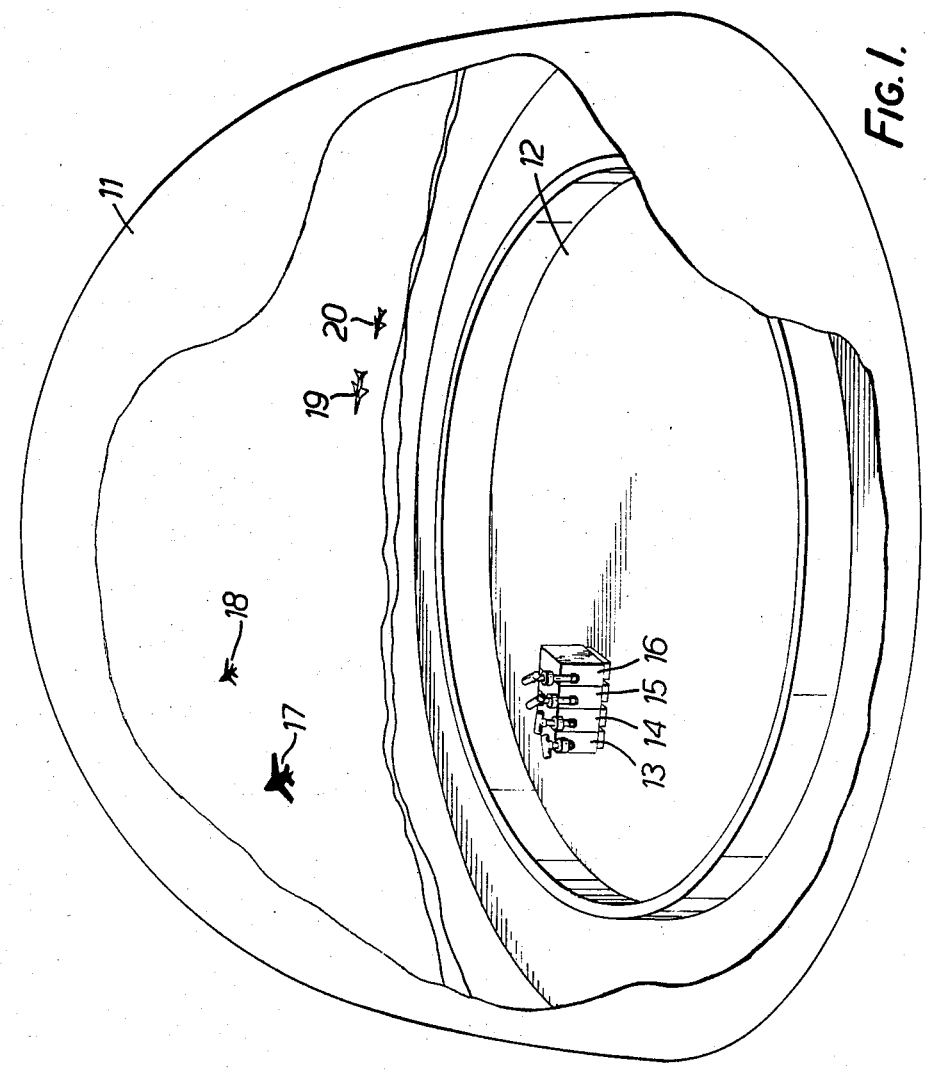
FIG. 1 is a schematic perspective view of a gunnery or missile launcher training installation employing target image presentation systems according to the invention.

Referring first to FIG. 1, the installation shown comprises a part-spherical dome 11 having a floor 12 on which are juxtaposed four identical target image presentation units 13,14,15 and 16 to provide for a trainee gunner (not shown) positioned at the centre of the dome target aircraft images 17,18,19 and 20 simulating aircraft flying predetermined flight profiles within the surrounding air space. To provide a realistic environment for the trainee gunner a plurality of slide projectors (not shown) are employed to produce on the interior surface of the dome background scenic images and a plurality of lighting systems (not shown) are employed to produce a realistic and variable sky illumination. The four target image presentation units 13,14,15 and 16 are arranged on the floor 12 of the dome 11 in positions offset from the centre of the dome and are conveniently located on a radial line from the centre of the dome floor 12.

Figure 2:
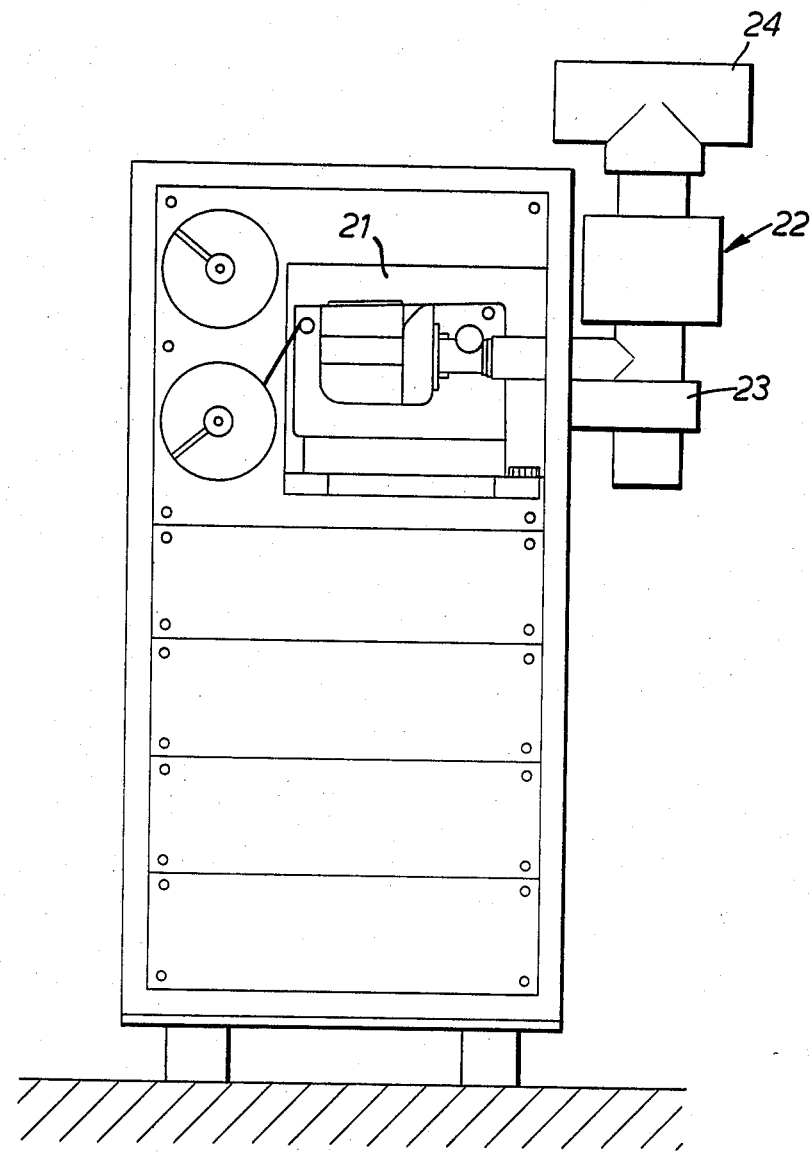
FIG. 2 is a schematic elevation of the target image presentation system employed in the installation shown in FIG. 1 and utilising a stationary cinematograph projector and a beam deflection assembly.

Each of the target image presentation units 13 to 16 takes the form illustrated in FIG. 2 and comprises a stationary cinematograph projector 21 for projecting in an image carrying beam target aircraft images from a cinematograph film bearing an appropriate target aircraft flight profile and a beam deflection assembly 22 for directing the image carrying beam to positions on the dome corresponding to those of an aircraft flying the appropriate profile. The beam deflection assembly 22 comprises a support column 23 and an image deflection head 24 rotatable on the column 23 about the vertical axis of the column.

Figure 3:
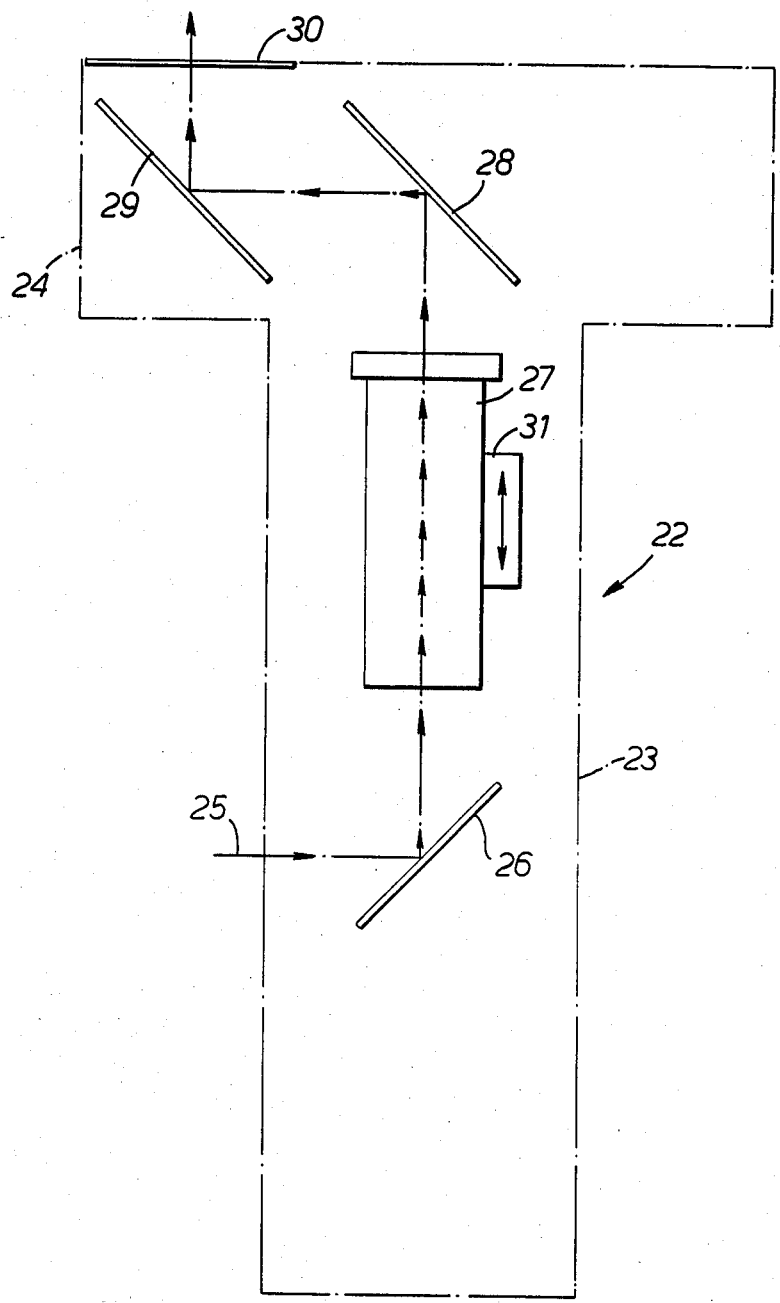
FIG. 3 is a diagrammatic elevation of the beam deflection assembly as illustrated in FIG. 2, showing the focus control lens used in the system.

The beam deflection assembly 22 is diagrammatically illustrated in FIG. 3, which shows the path taken by the image carrying beam 25 directed into the assembly 22 from the projector 21. As will be seen, the image carrying beam 25 is redirected into a vertical path along the axis of the column 23 by a first reflecting element 26. It then passes through a focus control lens 27 and is redirected back into a horizontal path by a second reflecting element 28 fixedly mounted in the deflection head 24. The beam is then redirected again into a path at right angles to the horizontal path by a third reflecting element 29 which is rotatably mounted in the deflection head 24 for rotation about the axis of the image carrying beam directed thereto. The beam reflected from the element 29 passes through a window 30 and projects the image on to the dome. Rotation of the deflection head 24 about the vertical axis of the column 23 causes a change in the azimuth of the image projected onto the dome while the rotation of the reflecting element 29 about the horizontal beam axis causes a change in the elevation of the image on the dome. The rotation of the head 24 and the reflecting element 29 is controlled preferably by servo motors fed with beam deflection control signals to bring the projected image to the required azimuth and elevation during the flight profile. The focus control lens 27 is provided with a drive unit 31 for varying the position of the lens axially to alter the focussed projection distance.

In operation, a cinematograph film bearing images of a plurality of target aircraft flight profiles is loaded into the projector 21 of each of the units 13 to 16. Each projector 21 is then set to run a predetermined one of the profiles from the film. As images of the target aircraft are projected from successive frames of the film, the beam deflection assembly 22 in each unit is driven to direct the projected image beam to positions on the dome simulating the positions of a target aircraft flying the flight profile. At the same time, a focus control signal is generated and applied to the focus drive unit 31 of the lens 27 to focus the image on the dome and hold it in focus throughout the flight profile.

Cinematograph film for use in the target image presentation units 13 to 16 may with advantage be produced by a method which comprises the steps of displaying a model of the target, producing on a first photographic film images of the model in a manner such that different frames of the film bear images of the model at different orientations relative to a predetermined line of sight, photographing on to successive frames of a second photographic film selected ones of the target images carried on the frames of the first film to produce a sequence of images on the second film having line of sight orientations corresponding to those which would be viewed by an observer during movement of the target flying a predetermined flight profile while adjusting the sizes of the images on the frames of the second film to simulate variations in the range of the target from the observer.

Production of the film by the above method is preferably carried out with the aid of a computer which generates shooting scripts for the camera operator. There are four stages involved in the production of the film. The first stage involves the running of a flight profile program, the second stage involves the running of a film production program which generates the shooting script for producing the first photographic film and the shooting script for producing the second photographic film, the third stage is the photographic process and the fourth stage is the collation of the several flight profile masters into a single length of cinematograph film followed by coding of the film.

The flight profile program is run to create a data file containing the aircraft's position and orientation, with respect to the earth's axis, at fixed intervals of time during its flight. This program is capable of representing all the basic flight profiles of a modern attack/offensive support aircraft. The input to the program is flight path data containing the aircraft's start position and subsequent manoeuvres during its flight.

The film production program is run to generate the shooting scripts for the profile. There are three sections to this program as follows:

(1) A first section calculates the aircraft's slant range and aircraft orientation along a line of sight as measured from the centre of the dome (LOS) at fixed time intervals along the flight path. The output from this is time, slant range, aircraft LOS heading, aircraft LOS pitch and aircraft LOS roll.

(2) A second section outputs the script for the operator to use in the production of the first film.

(3) A third section outputs the script for the operator to use in the production of the second film.

It will be appreciated that the data used in producing the scripts for production of the required flight profile on the film can be utilised for controlling the operation of the projector and the beam deflection assembly 22. In production of the operator's scripts, azimuth and elevation angles of the target from the dome centre are generated. Where the projector is located at the centre of the dome these can of course be used directly to control the rotation of the deflection head 24 to produce the required change in the azimuth of the image and to control the rotation of the reflecting element 29 to produce the required elevation of the image. It will however be appreciated that the azimuth and elevation angles as generated for the production of the film require correction for use with a projector offset from the centre of the dome. To compensate for the offset position however a sub-routine can readily be introduced to calculate the azimuth and elevation angles of the image as measured from the projector location. The sub-routine requires, as inputs, the azimuth and elevation angles of the projected image as measured from the dome centre, the dome radius and measurements defining the projector position relative to the dome centre. In particular, a sub-routine may be used to convert the azimuth and elevation angles utilising the following equations:

$$U = R \cos\theta$$

$$Z = (R \sin\theta) + h$$

$$X = U \sin\phi$$

$$Y = (U \cos\phi) - P_d$$

where

U and Z are Cartesian coordinates of the image on the dome in a vertical plane through the image and the dome centre, as measured from a horizontal plane through the dome centre, X and Y are Cartesian coordinates of the image on the dome in the horizontal plane through the dome centre, as measured from a datum line passing radially from the dome centre through the projector position, $\theta$ is the elevation angle of the image from the dome centre measured from the horizontal plane through the dome centre, $\phi$ is the azimuth angle of the image measured from the datum line passing radially from the dome centre through the projector position, R is the dome radius, h is the projector height above the horizontal plane, and $P_d$ is the distance of the projector from the dome centre measured along the datum line.

If $\theta$ is the elevation angle of the image on the dome measured from the projector position and $\phi'$ is the azimuth angle of the image on the dome measured from the projector position, it follows that:

$$\theta' = \tan^{-1}[Z/(X^2 + Y^2)^{\frac{1}{2}}]$$
$$\text{and}$$
$$\phi' = \tan^{-1}[X/Y].$$

In this sub-routine the projection range $P_r$ is readily be calculated from the following equation:

$$P_r = \frac{R \cdot \sin\theta + h}{\sin\phi'}$$

During production of the film, it becomes a simple process to generate a data file containing all the information required for the control of the projector 21 and the beam deflection assembly 22. This information is available at fixed time intervals of the flight profile. In particular, the elevation and azimuth angles $\theta'$ and $\phi'$ as calculated for the projector position are utilised to direct the beam from the deflection head in elevation and azimuth and the projection range Pr is utilised to provide a control signal for driving the focus control drive unit 31 of the focus control lens 27.

Each film produced is arranged to carry a large number of different target aircraft flight profiles and the film is supplied with a dedicated "profile disc" which carries a data file dedicated to each profile which is used when the section of the film having that profile is being run.

It will be appreciated that where the projection range of the image varies as a result of the offset position of the units 13 to 16, the light intensity of the image on the dome will also adversely vary throughout the flight profile. Control means are therefore preferably provided to compensate for this variation and may for example be used to vary the intensity of the projection lamp. A control signal for this purpose can equally readily be provided from a control value provided on the data file of the flight profile being projected.

It will furthermore be appreciated that as a result of the offset position of the units 13 to 16 image size will also vary over the flight profile unless correction is made. Such correction is preferably carried out when the film bearing the aircraft flight profiles is being made by making an appropriate adjustment of the sizes of the images transferred from the first film to the second film.

It will be apparent that rotations of the reflecting elements 28 and 29 in producing the desired azimuth and elevation of the image on the dome 11 give rise to rotations of the image on the dome. To compensate for those image rotations a derotation prism (not shown) is mounted in the path of the image carrying beam 25 for rotation about the axis of the beam and is arranged to be rotatably driven in response to a derotation signal derived from the azimuth and elevation control signals applied to drive the head 24 and the reflecting element 29.

Figure 4:
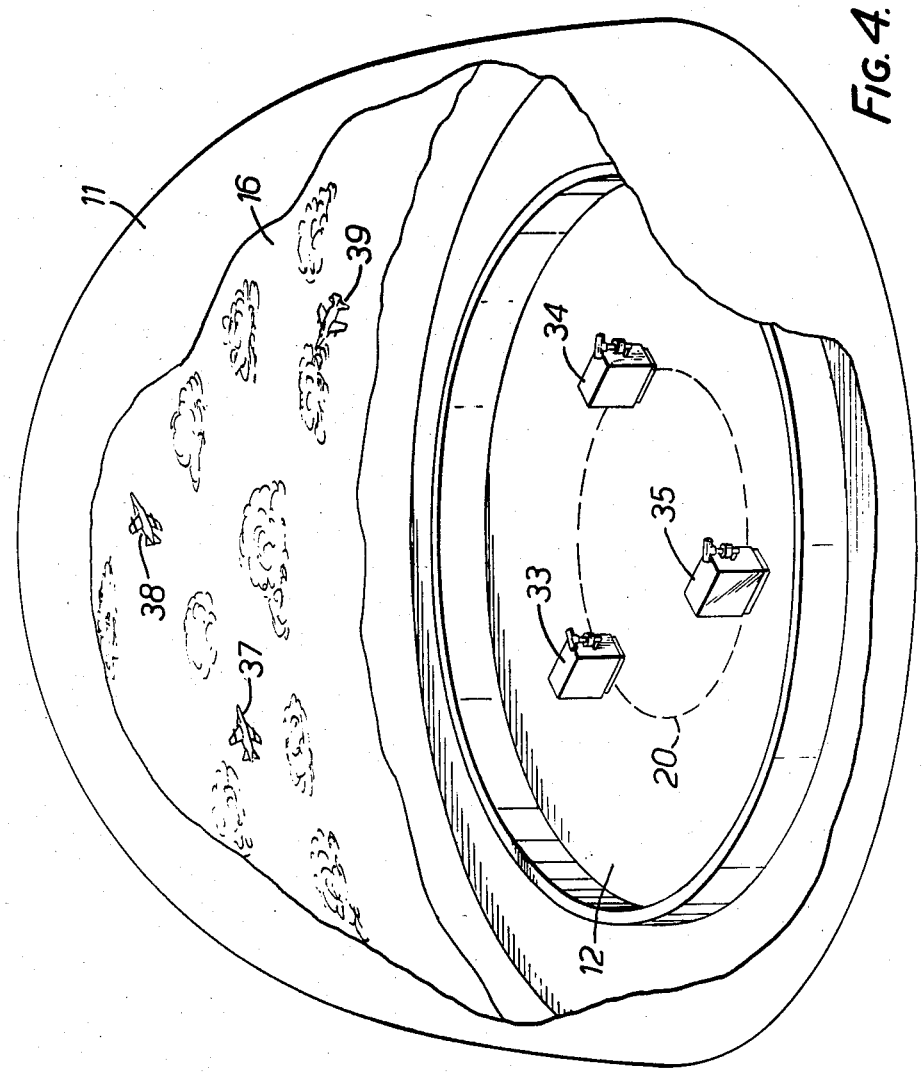
FIG. 4 is a schematic perspective view similar to that shown in FIG. 1, showing the target image presentation systems in alternative dispositions.

In an alternative embodiment of the invention illustrated in FIG. 4, three identical target image presentation units 33,34 and 35 are arranged on the floor 12 of the dome 11 in positions in which they are located at equi-angularly spaced positions on a location circle 20 having its centre at the centre of the dome floor 12. The simulated weapon is arranged at the centre of the dome and the three units are operated to provide target aircraft images 37,38 and 39.

The projectors 33,34 and 35 are arranged to project the target images from cinematograph film in the same manner as the units 13 to 16 described with reference to FIGS. 1 to 3 with control signals generated from data accessed from the data base file provided with each film. The film may be produced by the production method hereinbefore described with the data for the calculation of the azimuth and elevation angles of the image as measured from the projector position being measured from a datum line extending radially from the centre of the dome through the projector.

It will be appreciated that in the embodiment of the invention illustrated in FIG. 1 the film produced and the dedicated profile disc to be used with it can be accurate for only one of the four projectors. If however the four projectors are arranged next to each other as illustrated on a radial line and the location of one or other of the two intermediate projectors is chosen as that from which the projection range data is calculated then the projection range error arising as a result of the mis-positioning of the other projectors is found to be sufficiently small as to be ignored.

I claim:

1. A target presentation system for displaying images of a target on the interior surface of a part-spherical dome to provide for an observer within the dome a visual representation of an aerial target flying a predetermined flight profile within an airspace surrounding the observer comprising projection means disposed in a predetermined position offset from the center of the dome for projecting an image carrying beam carrying target images corresponding to those which would be viewed by a ground observer during the flight of the target in the predetermined flight profile and means disposed adjacent the predetermined position offset from the center of the dome directing the image carrying beam to positions on the dome corresponding to those positions of a target traversing the airspace represented by the dome, the projection means including focus control means to maintain the image on the dome in focus throughout the visual representation of the predetermined flight profile for a predetermined position of the target presentation system within the dome offset from the centre of the dome.

2. A system according to claim 1, wherein the focus control means comprises a focus control lens through which the image carrying beam from the projection means is caused axially to pass, and focus control drive means for moving the lens axially to bring the image into focus on the dome.

3. A system according to claim 2, wherein the focus control drive means is responsive to a focus control input obtained from a data file dedicated to the predetermined flight profile.

4. A system according to claim 3, wherein the beam direction means includes beam deflection drive means for directing the image carrying beam in accordance with the predetermined flight profile in response to a beam deflection control input obtained from the data file.

5. A system according to claim 4, wherein the projection means comprises a cinematograph projector for projecting the target images onto the dome from a cinematograph film bearing on successive frames of the film target images corresponding to those which would be viewed by a ground observer within the dome at successive time intervals during the flight of the target in the predetermined flight profile, wherein the cinematograph film for use in the system is produced by displaying a model of the target and producing from the model images on the film under the control of a film production program which produces scripts for the film production operator and which utilises data of the aircraft's position and orientation with respect to the earth's axis at fixed intervals of time throughout the flight profile and wherein the data file dedicated to the flight profile on the film is generated when the film production operator's scripts are produced.

6. A system according to claim 5, wherein the cinematograph projector is a stationary cinematograph beam deflection drive and the means includes a beam deflection assembly for directing the image carrying beam to positions on the dome corresponding to those of the aircraft flying the predetermined flight profile, with the beam deflection drive means being connected to drive the beam deflection assembly.

7. A system according to claim 6, wherein the beam deflection assembly comprises an azimuth deflection assembly for deflecting the image carrying beam in azimuth and an elevation deflection assembly for deflecting the image carrying beam in elevation and wherein the data file dedicated to the flight profile provides values of the elevation and azimuth of the image on the dome for use in generating azimuth deflection control signals for driving the azimuth deflection assembly and elevation deflection control signals for driving the elevation deflection assembly.

8. A system according to claim 7, wherein the azimuth deflection assembly comprises a first inclined reflecting element which directs the image carrying beam from the stationary projector into a vertical path and a second inclined reflecting element which redirects the vertically directed beam into a horizontal path and which is rotatable about the axis of the vertically directed beam to vary the azimuth of the image on the dome and wherein the focus control lens is arranged in the vertical beam path between the first and second reflecting elements.

9. A system according to claim 8, wherein the second reflecting element is mounted in a rotatable head and the elevation deflection assembly comprises a third reflecting element which is carried by the head for redirecting the image carrying beam in the horizontal path into a path at right angles to the horizontal path and which is rotatable about the axis of the beam in the horizontal path to vary the elevation of the image on the dome.

10. A system according to claim 5, wherein the scripts for the film production operators are such as to produce images on the film which correct for variations in the size of the image resulting from the offsetting of the system from the centre of the dome.

11. A system according to claim 5, wherein data on the data file dedicated to the flight profile is accessed to control the image intensity to compensate for variations resulting from the offsetting of the system from the centre of the dome.

12. A system according to claim 5, wherein each film produced contains a plurality of different flight profiles and a dedicated flight profile disc is provided for use with each film, which carries a data file dedicated to each profile and which is accessed when the film is run.

* * * * *

UNITED STATES PATENT AND TRADEMARK OFFICE
CERTIFICATE OF CORRECTION

PATENT NO.   :   4,573,924

DATED        :   March 4, 1986

INVENTOR(S) :   Anthony Nordberg

It is certified that error appears in the above-identified patent and that said Letters Patent is hereby corrected as shown below:

Column 2, line 8, after "dome" and before "it" insert a comma (,);

Column 2, line 22, delete "and";

Column 2, line 32, delete "on to" and insert --onto--

Column 3, line 51, after "dome" insert a comma (,);

Column 4, line 24, delete "on to" and insert --onto--;

Column 6, line 18, delete "θ" and insert --θ'--;

Column 6, line 28, delete "be".

Column 8, line 30, after "cinematograph" insert --projector and the--;

Column 8, line 31, delete "and the".

Signed and Sealed this

Twenty-second Day of July 1986

[SEAL]

Attest:

DONALD J. QUIGG

Attesting Officer

Commissioner of Patents and Trademarks